United States Patent
Sato et al.

(10) Patent No.: US 11,344,921 B2
(45) Date of Patent: May 31, 2022

(54) CLEANING APPARATUS AND CLEANING METHOD

(71) Applicant: CANON KABUSHIKI KAISHA, Tokyo (JP)

(72) Inventors: Yohei Sato, Yokohama (JP); Momoe Katsumata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 16/523,248

(22) Filed: Jul. 26, 2019

(65) Prior Publication Data

US 2020/0036870 A1    Jan. 30, 2020

(30) Foreign Application Priority Data

Jul. 30, 2018 (JP) .............................. JP2018-142900

(51) Int. Cl.
| | |
|---|---|
| *B08B 1/00* | (2006.01) |
| *H04N 5/217* | (2011.01) |
| *B08B 5/02* | (2006.01) |
| *G02B 27/00* | (2006.01) |
| *B08B 3/02* | (2006.01) |

(52) U.S. Cl.
CPC .............. *B08B 1/008* (2013.01); *B08B 1/006* (2013.01); *B08B 3/02* (2013.01); *B08B 5/02* (2013.01); *G02B 27/0006* (2013.01); *H04N 5/2171* (2013.01)

(58) Field of Classification Search
None
See application file for complete search history.

(56) References Cited

U.S. PATENT DOCUMENTS

| | | | | |
|---|---|---|---|---|
| 5,354,014 | A * | 10/1994 | Anderson ................. | B64F 5/23 244/134 C |
| 2005/0129394 | A1 | 6/2005 | Ichikawa | |
| 2007/0195185 | A1 | 8/2007 | Onuki | |
| 2007/0247607 | A1 | 10/2007 | Shibazaki | |
| 2012/0117745 | A1 * | 5/2012 | Hattori ...................... | B60S 1/54 15/250.01 |
| 2013/0048036 | A1 * | 2/2013 | Jonas ..................... | B60S 1/0848 134/167 R |
| 2015/0203076 | A1 * | 7/2015 | Irie .......................... | B60S 1/481 134/56 R |
| 2015/0203077 | A1 * | 7/2015 | Gokan .................... | B60R 11/04 134/36 |

(Continued)

FOREIGN PATENT DOCUMENTS

| | | |
|---|---|---|
| CN | 102181844 A | 9/2011 |
| CN | 105744874 A | 7/2016 |

(Continued)

*Primary Examiner* — Mikhail Kornakov
*Assistant Examiner* — Ryan L Coleman
(74) *Attorney, Agent, or Firm* — Canon U.S.A., Inc. I.P. Division

(57) ABSTRACT

A cleaning method by which a cleaning apparatus including a first cleaner and a second cleaner cleans a detection element including a detection surface includes cleaning by the first cleaner the detection surface of the detection element by wind pressure, and wiping the detection surface of the detection element with the second cleaner in a contacted manner, wherein the cleaning by the first cleaner and the wiping by the second cleaner are performed in this order.

31 Claims, 8 Drawing Sheets

(56) References Cited

U.S. PATENT DOCUMENTS

2015/0329083 A1* 11/2015 Kiyohara .............. B60S 1/0848
348/148
2018/0009418 A1 1/2018 Newman

FOREIGN PATENT DOCUMENTS

| CN | 106019557 A | 10/2016 |
|----|-------------|---------|
| JP | 2001-075241 A | 3/2001 |
| JP | 2005-024905 A | 1/2005 |
| JP | 4537105 B2 | 9/2010 |
| WO | 2015/198645 A1 | 12/2015 |

* cited by examiner

CLEANING APPARATUS AND CLEANING METHOD

BACKGROUND OF THE INVENTION

Field of the Invention

The present invention relates to a cleaning apparatus and a cleaning method for cleaning a detection surface of a detection element configured to detect a physical quantity such as light and electromagnetic waves.

Description of the Related Art

Detection surfaces of detection elements for detecting light or electromagnetic waves have an issue of misdetection due to adhering dust. For example, in the case of a digital camera including an image sensor in which photoelectric converters serving as light receiving elements are arranged, the imaging surface of the image sensor is cleaned on a regular basis to prevent degradation of the image quality of obtained images. The imaging surface can be damaged by mistake if the user cleans the imaging surface by himself/herself. Digital cameras therefore have typically been brought to service stores run by the manufacturers for cleaning by professional workers. However, even professional workers have different levels of skills and do cleaning with different operation accuracies. Japanese Patent No. 04537105 discusses an apparatus that is connected to a camera and cleans the surface of the imaging surface by wind pressure or by wiping with an adhesive sheet.

SUMMARY OF THE INVENTION

According to an aspect of the present invention, a cleaning method by which a cleaning apparatus including a first cleaner and a second cleaner cleans a detection element including a detection surface includes cleaning by the first cleaner the detection surface of the detection element by wind pressure, and wiping the detection surface of the detection element with the second cleaner in a contacted manner, wherein the cleaning by the first cleaner and the wiping by the second cleaner are performed in this order.

According to another aspect of the present invention, a cleaning method by which a cleaning apparatus including a cleaning unit cleans a detection element including a detection surface configured to detect a physical quantity includes cleaning the detection surface of the detection element by the cleaning unit, and capturing an image of the detection surface by an imaging unit and displaying a check result of the detection surface based on the captured image on a display unit by a control unit.

According to yet another aspect of the present invention, a cleaning apparatus for cleaning a detection element including a detection surface includes a first cleaner including a nozzle configured to discharge a jet of air, the first cleaner being configured to clean the detection surface with the air, a second cleaner including a wiper configured to wipe dust off from the detection surface in a contacted manner, and a control unit configured to control the first cleaner, the second cleaner, and a driving unit, wherein the control unit is configured to control the first cleaner and the second cleaner to cause the first cleaner to perform cleaning before wiping by the second cleaner.

According to yet another aspect of the present invention, a cleaning apparatus for cleaning a detection element including a detection surface configured to detect a physical quantity includes a cleaning unit configured to clean the detection surface, and a control unit configured to capture an image of the detection surface and display a check result of the detection surface based on the captured image on a display unit.

Further features of the present invention will become apparent from the following description of exemplary embodiments with reference to the attached drawings.

DESCRIPTION OF THE EMBODIMENTS

Exemplary embodiments of the present invention will be described in detail below with reference to the accompanying drawings.

The foregoing Japanese Patent No. 04537105 does not include a sufficient discussion about how to control the cleaning apparatus to remove dust from the detection surface (imaging surface). The issue of removing dust adhering to the detection surface is not limited to image sensors but is common among detection elements in general that include a detection surface for detecting a physical quantity. Cleaning apparatuses are thus similarly demanded. The present invention is directed to providing a cleaning apparatus and a cleaning method that can deal appropriately with the removal of dust adhering to a detection surface of a detection element including the detection surface.

Figure 1A:
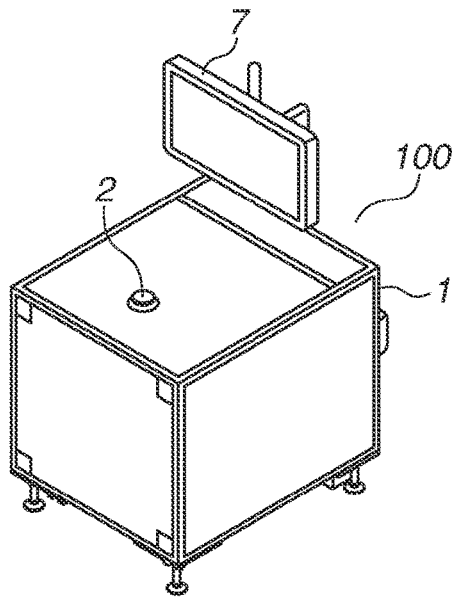
FIG. 1A is an external front perspective view of a cleaning apparatus according to an exemplary embodiment.
Figure 1B:
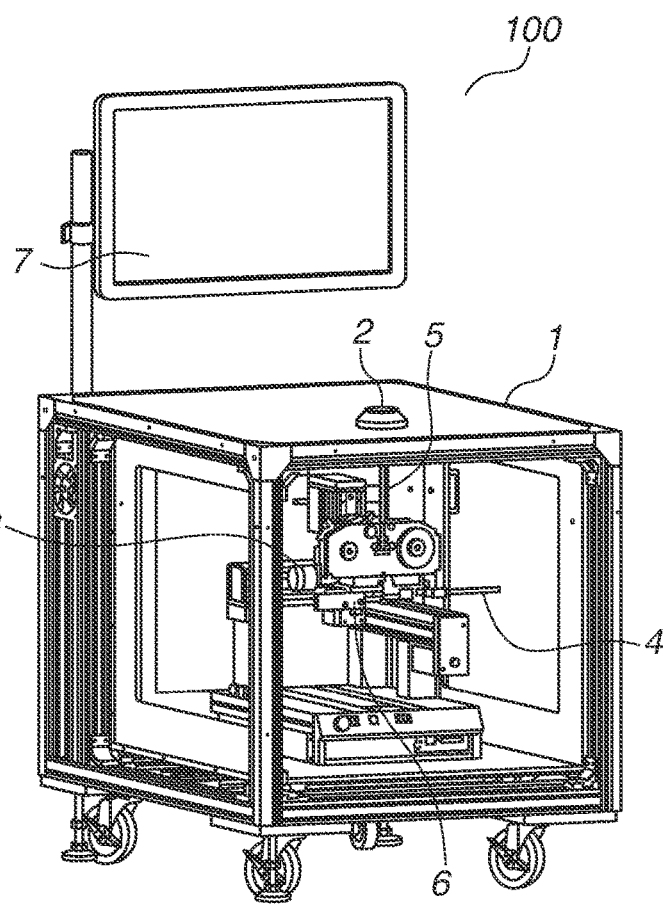
FIG. 1B is a diagram illustrating an internal configuration of the cleaning apparatus.
Figure 1C:
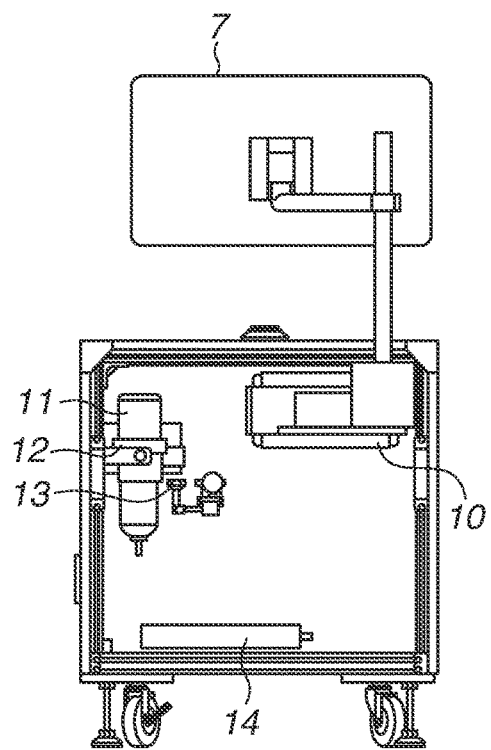
FIG. 1C is a diagram illustrating a configuration of a rear interior of the cleaning apparatus.

FIGS. 1A to 1C illustrate a cleaning apparatus 100 as an example of a cleaning apparatus according to an exemplary embodiment. In the present exemplary embodiment, the cleaning apparatus 100 is described to be intended to clean an imaging surface of an image sensor included in a digital camera. Examples of the image sensor include a complementary metal-oxide-semiconductor (CMOS) sensor.

FIG. 1A is an external view of the cleaning apparatus 100. The cleaning apparatus 100 includes a main body 1 including a metal chassis, a fixing portion 2 to which a detection apparatus to be cleaned (in the present exemplary embodiment, a camera) is fixed, and a display unit 7 that displays various types of information. The display unit 7 may be configured as a separate member that can communicate with the cleaning apparatus 100.

FIG. 1B is a diagram illustrating an internal configuration of the cleaning apparatus 100. A movable base 6 integrally includes a check unit 3, a first cleaning unit 4, and a second cleaning unit 5. The movable base 6 translates and rotates in three-dimensional directions, whereby the positions of the units can be freely changed. In particular, the movable base 6 includes a translation mechanism capable of vertical translation so that the units can approach the position of the fixing portion 2, i.e., the image sensor surface (detection surface) of the camera 200 mounted thereon and retract to the cleaning apparatus side.

The fixing portion 2 includes a ring-shaped metal member arranged on an exterior surface of the main body 1. In the present exemplary embodiment, the fixing portion 2 has a structure on which a camera mount for mounting and dismounting an interchangeable lens when the camera to be cleaned is in normal use can be mounted and fixed. The fixing portion 2 can communicate with a mounted camera that includes electrical connection terminals. The fixing portion 2 includes an annular lighting for providing the needed amount of light in monitoring the state of cleaning by the cleaning apparatus 100. The lighting irradiates the detection element to be cleaned (image sensor of the camera) with light during cleaning of the detection element by the first and second cleaning units 4 and 5. The appropriate shape of the fixing portion 2 varies depending on the type of external apparatus to be mounted. The fixing portion 2 may therefore be configured to be detachably attached to the main body 1, and replaced based on the external apparatus expected to be connected. Fixing portions 2 may be provided as many as the types of external apparatuses expected to be connected.

In the present exemplary embodiment, the connection terminals on the camera mount of the camera to be mounted are used to detect the mounting of the camera. More specifically, a camera is detected to be mounted on the cleaning apparatus 100 based on the electrical connection of the connection terminals on the fixing portion 2 with those on the camera mount.

The first cleaning unit 4 is a cleaning tool for cleaning the detection element surface in a contactless manner. In the present exemplary embodiment, the first cleaning unit 4 emits a jet of air to blow off dust by wind pressure.

The second cleaning unit 5 is a cleaning tool for cleaning the detection element surface in a contact manner According to the present exemplary embodiment, the second cleaning unit 5 catches dust by wiping with a wiper.

FIG. 1C is a diagram illustrating a configuration of a rear interior of the cleaning apparatus 100. Suppose that, in normal conditions, covers are attached to an external casing of the main body 1 to cover components attached to an inner casing. A control unit 10 includes a computer including a central processing unit (CPU). The control unit 10 governs operation control of the entire cleaning apparatus 100. The control unit 10 processes information from each part and issues instructions to each part.

An air filter 11 is a filter for reducing dust and oil components contained in the air to be used by the first cleaning unit 4 when the air is injected from an external pump via a suction port 12. The air passed through the air filter 11 is supplied to the first cleaning unit 4. Without the air filter 11, the dust contained in the air can be blown against the detection surface of the detection element. A pressure gauge 13 measures and indicates the pressure of the injected air. The user can observe the pressure indicated by the pressure gauge 13 and adjust the external pump to an appropriate pressure when needed.

A power supply 14 supplies power to the entire cleaning apparatus 100. The power supply 14 may have a function of feeding power to the external apparatus via an interface (in the present exemplary embodiment, the electrical connection terminals of the fixing portion 2 or a communication unit 17 to be described below).

Figure 2:
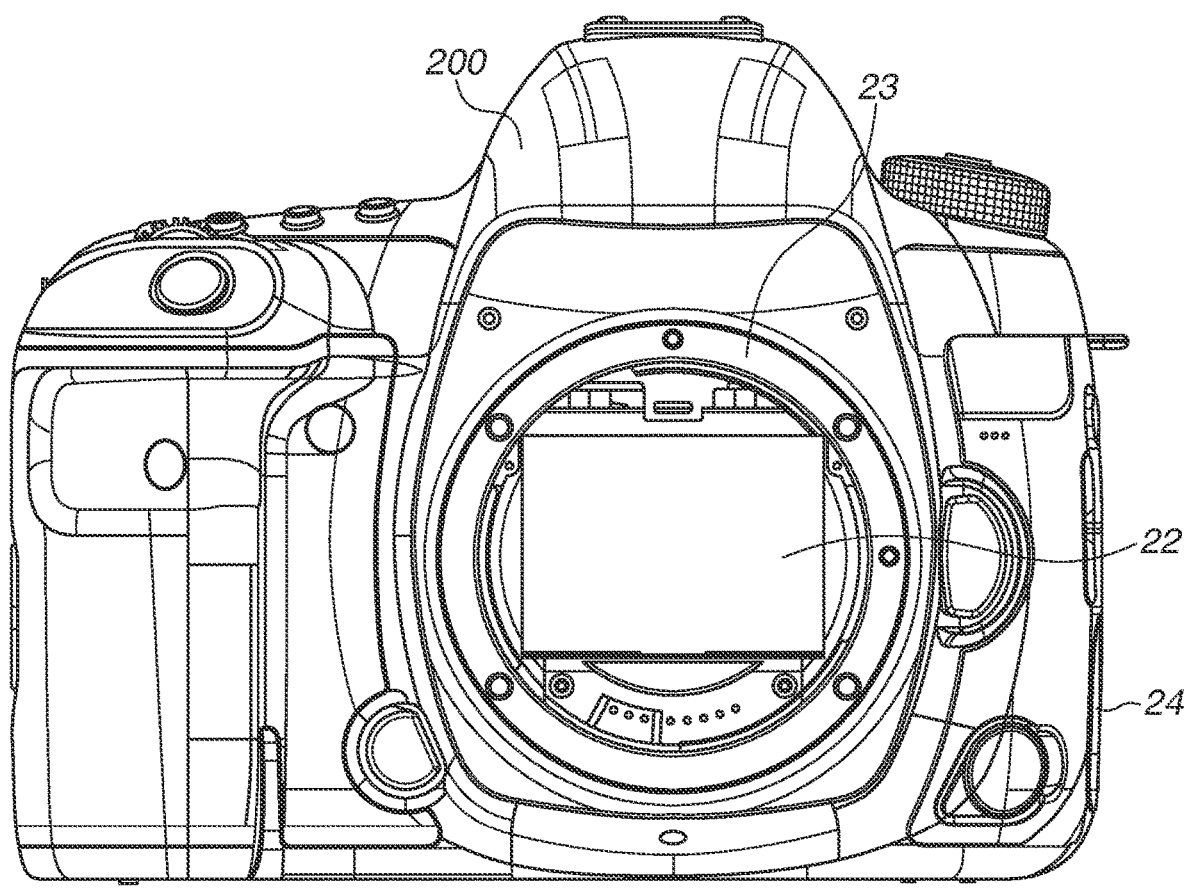
FIG. 2 is a front view of an imaging apparatus according to the present exemplary embodiment.

FIG. 2 illustrates a camera 200 as an example of an apparatus including an image sensor that is the detection element to be cleaned. In the present exemplary embodiment, the camera 200 is an interchangeable lens digital single lens reflex camera. A camera communication unit 24 includes a communication terminal complaint with a communication standard inside a cover. When connected to the communication unit 17 of the cleaning apparatus 100 with a cable such as a Universal Serial Bus (USB) cable, the camera communication unit 24 communicates with the cleaning apparatus 100 in an electrically connected state. If the external apparatus is a lens, a not-illustrated camera control unit performs lens control and exchanges various types of information about the lens and the camera 200 with the lens. An image sensor 22 receives object light and converts the received object light into an electrical signal, thereby digital image data is generated. While in the present exemplary embodiment the camera 200 uses a CMOS sensor, various other sensors may be used, including a charge-coupled device (CCD) sensor and a charge injection device (CID) sensor. The target to be cleaned by the present cleaning apparatus 100 is not limited to a light receiving element. Detection elements of any form can be targeted as long as the detection elements have a function of performing detection at their element surface. Examples include a detection element for detecting electromagnetic waves such as X-rays. The image sensor 22 has a structure such that a cover glass, an infrared (IR) cut filter, and a low-pass filter (LPF) are stacked on photodiodes in a thickness direction. The cleaning target of the present cleaning apparatus 100 is the outermost surface of the image sensor 22.

Next, a configuration of connection between the cleaning apparatus 100 according to the present exemplary embodiment and the detection apparatus according to the present exemplary embodiment will be described with reference to FIGS. 1B and 2.

The camera 200 is fixed by connecting the camera fixing portion 23 to the fixing portion 2 of the cleaning apparatus 100. The control unit 10 can control the camera 200 by communicating with a camera control unit 21 (see FIG. 3) via the communication unit 17 to be described below and the camera communication unit 24. For example, the cleaning apparatus 100 can determine the model of the camera 200 and control imaging operations of the camera 200, like moving a mirror and a shutter.

In FIG. 1B, the second cleaning unit 5 is directed toward the fixing portion 2. Since the movable base 6 includes the translation mechanism that translates up and down, the second cleaning unit 5 can pass through the ring center of the fixing portion 2 and approach the image sensor 22 in the state where the camera 200 is physically connected.

The movable base 6 includes a rotation mechanism for rotating members attached thereto. The check unit 3, the first cleaning unit 4, and the second cleaning unit 5 are arranged around the rotation axis of the rotation mechanism at positions of respective different phases. The rotation mechanism can drive the check unit 3 and the first cleaning unit 4 to rotate so that the front sides of the units come to a position opposed to the fixing portion 2 (i.e., the image sensor surface of the image sensor 22) like the second cleaning unit 5.

The rotation mechanism of the movable base 6 is also used to control the tilt (angle) of the cleaning units with respect to the detection surface in cleaning sequences of the respective cleaning units to be described below. More specifically, based on control of the control unit 10, the rotation mechanism controls the tilt of a nozzle when the first cleaning unit 4 emits a jet of air to the detection surface of the image sensor 22, and the tilt of the wiper (and core member) when the second cleaning unit 5 wipes the detection surface. In such a manner, the control unit 10 can control the distances of the units to the detection surface by making each unit opposed to, approach, and retract from the fixing portion 2, i.e., the detection surface of the detection element, using the translation mechanism and rotation mechanism of the movable base 6.

The check unit 3 includes a lighting, and irradiates the target with illumination light based on instructions from the control unit 10. According to the present exemplary embodiment, the check unit 3 includes a light-emitting diode (LED) at its tip. The check unit 3 is used to obtain an image for checking the state of stains on the element surface (sensor surface) of the image sensor 22 by irradiating the image sensor 22 from a close proximity and capturing an image of the sensor surface here. In the exemplary embodiment described below, the imaging function of the image sensor 22 is used to obtain the image of the sensor surface. However, the present invention is not limited thereto. The check unit 3 itself may include some kind of sensor such as an image sensor, and be able to obtain information from which the state of the detection element surface can be checked. In the present exemplary embodiment, the check unit 3 is attached to the movable base 6 along with the first and second cleaning units 4 and 5. However, the check unit 3 may be fixedly installed near the fixing portion 2, for example. Such installation enables irradiation and imaging even during cleaning by the cleaning units 4 and 5. A lighting and/or an image sensor may be provided as the check unit 3 near the cleaning member (nozzle or wiper at the tip of the core member) of the first cleaning unit 4 or the second cleaning unit 5.

The first cleaning unit 4 is a cleaning tool for cleaning the detection element surface in a contactless manner According to the present exemplary embodiment, the first cleaning unit 4 emits a jet of air from the tip (nozzle) of a cylindrical member to blow off dust adhering to the surface of the image sensor 22 in close proximity by wind pressure. In the present exemplary embodiment, the first cleaning unit 4 includes an ionizer for electrically charging the air to provide a destaticizing function so that the dust adhering to the surface of the image sensor 22 is destaticized to come off easily. The ionizer is not necessarily needed, since the blowing of air without the destaticizing function provides a certain level of effect.

The second cleaning unit 5 is a cleaning tool for cleaning the detection element surface in a contact manner. In the present exemplary embodiment, the second cleaning unit 5 directly sweeps the surface of the image sensor 22 in close proximity to catch dust by wiping using the wiper attached mainly to the tip of the core member. Examples of the wiper include an ultrafine fiber cloth, paper, and tape. The wiper is of take-up reel type and is configured so that a new portion of the wiper makes contact with the surface to be cleaned as the second cleaning unit 5 comes into contact and moves for wiping. According to the present exemplary embodiment, the second cleaning unit 5 is also configured so that cleaning can be performed with the wiper permeated with a solvent for removing oil stains if needed. Neither of the first cleaning unit 4 and the second cleaning unit 5 is limited to any particular configuration as long as the first and second cleaning units 4 and 5 are cleaning tools of contactless type and contact type, respectively.

Figure 3:
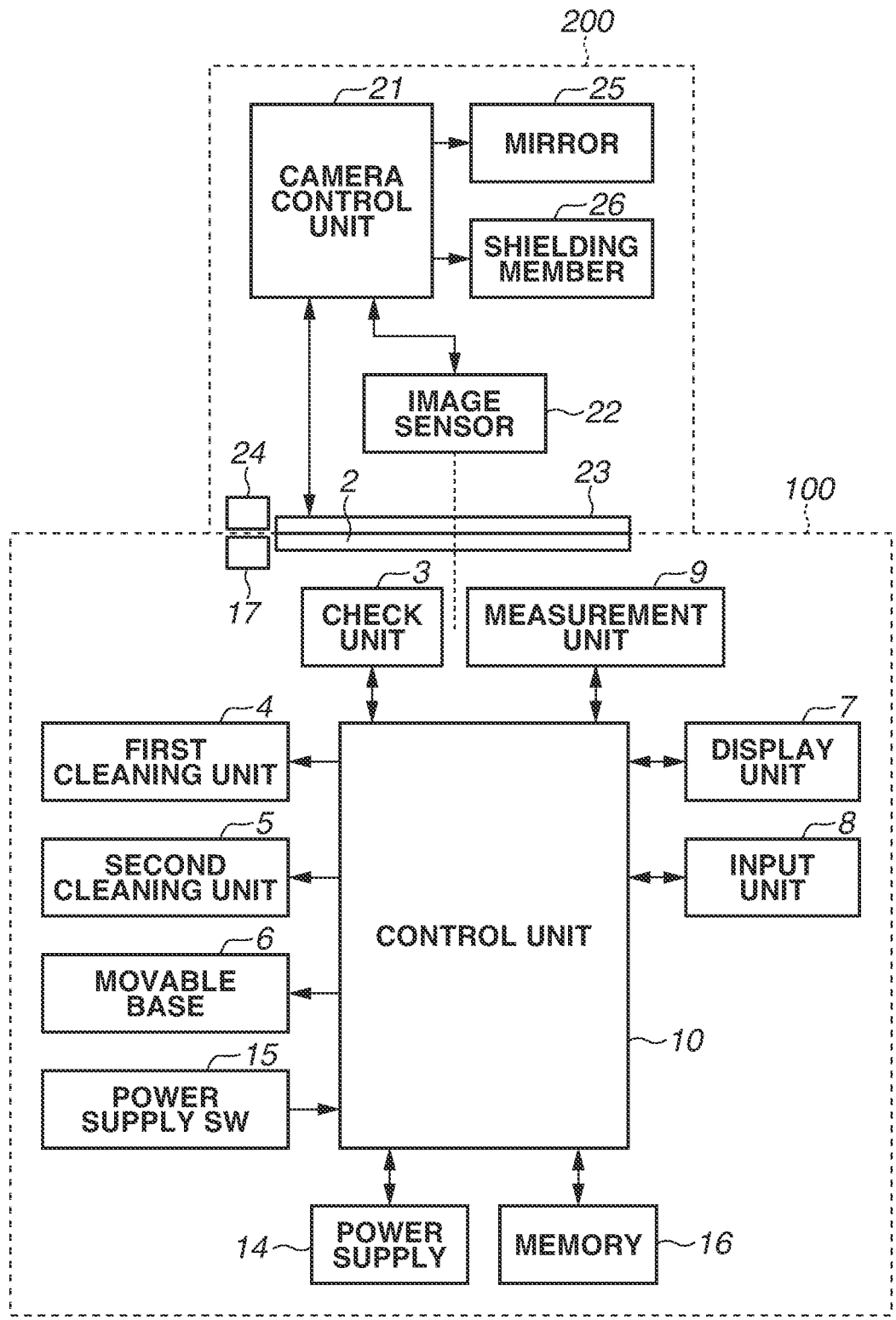
FIG. 3 is a block diagram illustrating a main configuration of the cleaning apparatus and the imaging apparatus according to the present exemplary embodiment.

FIG. 3 is a block diagram illustrating a main electrical configuration of the cleaning apparatus 100 and the camera 200 according to the present exemplary embodiment.

The cleaning apparatus 100 operates on the power supplied from the power supply 14. The power is switched on and off by a power supply switch (SW) 15. The display unit 7 displays various types of information based on instructions from the control unit 10. Examples of the information include various types of information about the cleaning apparatus 100 and the camera 200, as well as operating states, settings made by user operations, and instructions for user operation.

To perform appropriate operations based on the mounted camera, information about the external apparatus, which is either stored in a memory 16 or obtained via the communication unit 17 or other communication channels, is input to an input unit 8. Various types of instruction information given by user operations are also input to the input unit 8. In the present exemplary embodiment, model information and specification-related information about the connected camera 200 is obtained via the input unit 8 as the information about the external apparatus.

A measurement unit 9 includes a laser distance meter, for example. The measurement unit 9 measures the position (such as coordinates and a distance to the image sensor 22) and size of the image sensor 22 of the connected camera 200. If the model information about the mounted camera 200 is determined and a corresponding cleaning program is stored in the memory 16, the measurement unit 9 does not necessarily need to be provided to measure the position and size. The control unit 10 includes a computer including a CPU built in the main body 1 of the cleaning apparatus 100. The control unit 10 governs the operation control of the cleaning apparatus 100, processes information from each part, and issues instructions to each part.

The connection terminals provided on the fixing portion 2 detect electrical connection of the connection terminals of the camera fixing portion 23 (in FIG. 2, eight connection terminals in the lower part) when the camera fixing portion 23 is attached to the fixing portion 2. The control unit 10 thereby detects the connection of the camera 200.

The communication unit 17 communicates with the detection apparatus including the detection element. According to the present exemplary embodiment, the communication unit 17 is a connection terminal compliant with a USB standard, and is electrically connected to the camera communication unit 24 of the camera 200 via a connection cable. If the connection cable is connected to the terminals of the communication unit 17 and the camera communication unit 24 with both the cleaning apparatus 100 and the camera 200 powered on, the communication unit 17 and the camera communication unit 24 are energized to establish communication. The method of communication between the cleaning apparatus 100 and the camera 200 is not limited thereto, and conventional communication methods such as a wired local area network (LAN), High-Definition Multimedia Interface® (HDMI), and wireless LANs (Wi-Fi, Bluetooth®, and Bluetooth® Low Energy) can be applied.

Next, a configuration example of the camera 200 detachably connected to the cleaning apparatus 100 will be described. The camera control unit 21 is a microcomputer and governs control of the entire camera 200, including operation control of the image sensor 22, storage of captured images, and data communication.

The image sensor 22 has a detection surface constituted by photodiodes which is located at a position accessible through an opening where the camera mount is provided and normally receives a light beam from an object with an imaging lens mounted on the camera 200. The light beam received by the image sensor 22 is converted into an electrical signal, whereby image data is output.

In the camera 200, a mirror 25 is located on an optical axis, on a side closer to the object than the image sensor 22 is. The mirror 25 reflects or spectrally diffracts the light traveling toward the image sensor 22 to a not-illustrated sensor other than the image sensor 22 or to an optical viewfinder. During cleaning of the image sensor 22, the mirror 25 needs to be retracted from the optical axis of the image sensor 22 by a considerable amount. According to the present exemplary embodiment, a mechanism by which the camera 200 retracts the mirror 25 from the optical axis during exposure of the image sensor 22 is used to retract the mirror 25 from the optical axis to an extent such that the members from the cleaning apparatus 100 can approach the image sensor 22 during cleaning. According to the present exemplary embodiment, the camera 200 that is the detection apparatus is a digital single lens reflex camera including the mirror 25. The present exemplary embodiment is also applicable to a mirrorless single lens camera, which includes neither an optical viewfinder nor a mirror.

In the camera 200, a shielding member 26 is located on the side closer to the object than the image sensor 22 is. The shielding member 26 serves as a shutter for shielding the image sensor 22 from light during imaging.

Next, various operation sequences of the cleaning apparatus 100 will be described with reference to FIGS. 4A to 4C.

Figure 4A:
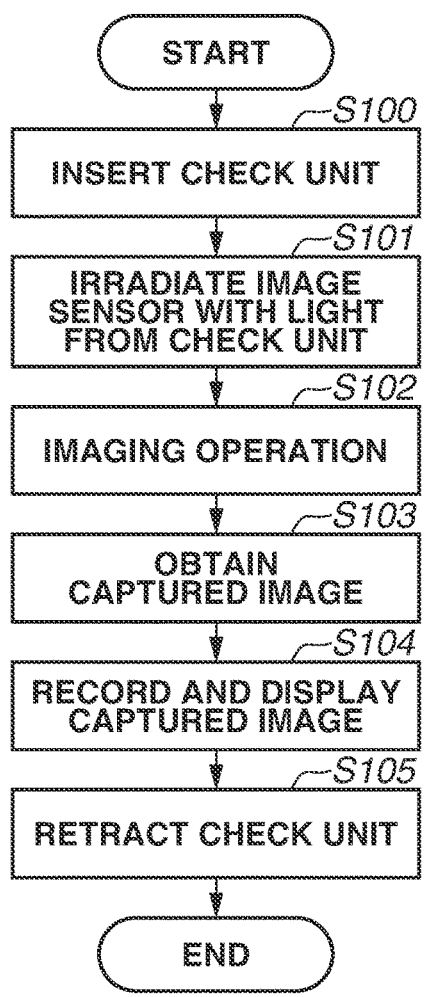
FIGS. 4A to 4C are flowcharts for describing sequences of the cleaning apparatus according to the present exemplary embodiment.

FIG. 4A is a flowchart for describing a check sequence for checking the state (state of stains or cleaning state) of the detection element surface to be cleaned by using the check unit 3. The control unit 10 performs the operations of the flowchart or issues operation instructions to various components as appropriate in an entire cleaning sequence performed by the cleaning apparatus 100. At the stage when this check sequence is started, the cleaning apparatus 100 is in a state where the camera 200 is already fixed by the camera fixing portion 23 and the fixing portion 2, and the communication unit 17 has established communication with the camera 200 via the camera communication unit 24 and a USB connection cable.

In step S100, the control unit 10 initially controls the movable base 6 to direct the check unit 3 toward the fixing portion 2 and move the check unit 3 to pass through the fixing portion 2 and the camera fixing portion 23 so that the tip of the check unit 3 approaches the image sensor 22. In step S101, the check unit 3 arranged near the image sensor 22 irradiates the image sensor 22 with light emitted from a point source such as the LED attached to the tip of the check unit 3. The mode of lighting is not limited to a point source, and any mode of light is applicable. However, a point source is desirable because uniform light is likely to be incident on each element and the state of the detection surface can be measured under almost the same condition.

In step S102, with the image sensor 22 irradiated by the lighting, the control unit 10 transmits a signal to the camera control unit 21 via the communication unit 17 and the camera communication unit 24 so that the image sensor 22 performs an imaging operation. In step S103, the camera control unit 21 obtains the captured image. In step S104, the obtained image is recorded into the memory 16 via the communication unit 17. The image is also converted into a display image and displayed on the display unit 7. The control unit 10 here detects information about the state of the image sensor surface, dust, and stains from the captured and recorded image by using conventional image analysis techniques such as singularity detection, and displays the information on the display unit 7 along with the image. According to the present exemplary embodiment, based on such pieces of information, the control unit 10 further checks the initial state of the imaging surface, makes a cleaning completion determination after cleaning, and presents a comparison before and after cleaning. In the present exemplary embodiment, the control unit 10, when performing the check sequence after some kind of cleaning, can present a comparison of results before and after the cleaning on the display unit 7 as a check result and thereby inform the user of the cleaning effect and remaining dust. In step S105, after the recording of the image, the control unit 10 retracts the check unit 3 from near the image sensor 22 into the cleaning apparatus 100. The check sequence ends.

Figure 4B:
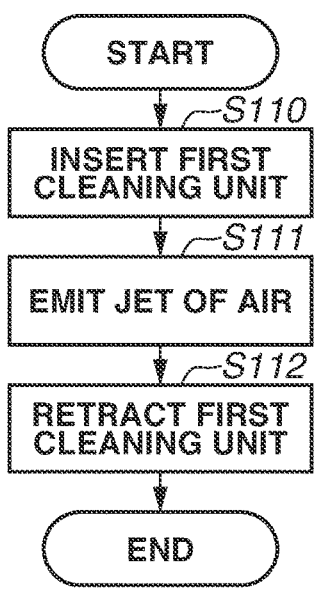

FIG. 4B is a flowchart for describing a first cleaning sequence in which the first cleaning unit 4 is used to clean the detection element surface by a contactless cleaning method. The control unit 10 performs the operations of the flowchart or issues operation instructions to various components as appropriate in the entire cleaning sequence performed by the cleaning apparatus 100. At the stage when this first cleaning sequence is started, the cleaning apparatus 100 is in a state where the camera 200 is already fixed by the camera fixing portion 23 and the fixing portion 2, and the cleaning apparatus 100 has established communication with the camera 200 via the camera communication unit 24 and the communication unit 17.

In step S110, the control unit 10 initially controls the movable base 6 to direct the first cleaning unit 4 toward the fixing portion 2 and move the first cleaning unit 4 to pass through the fixing portion 2 and the camera fixing portion 23 so that the portion (tip) of the first cleaning unit 4 to be used for cleaning approaches the image sensor 22. In step S111, the first cleaning unit 4 located near the image sensor 22 emits a jet of air from the nozzle at the tip.

Figure 6A:
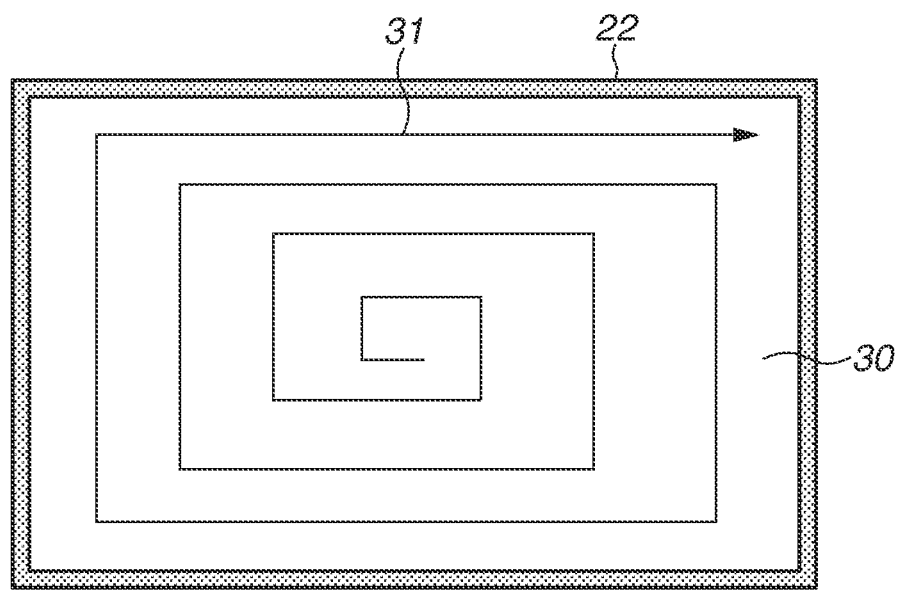
FIGS. 6A and 6B are diagrams illustrating an image sensor in a first cleaning sequence according to the present exemplary embodiment.
Figure 6B:
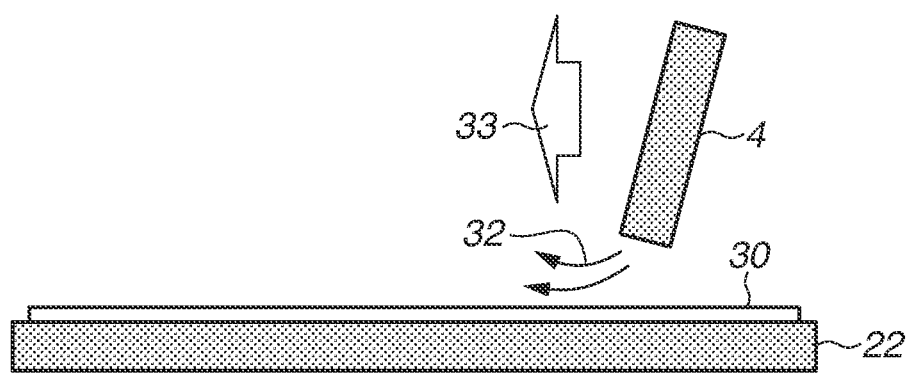

FIGS. 6A and 6B are conceptual diagrams for describing the cleaning method of the first cleaning unit 4 in step S111. FIG. 6A illustrates a front view of an image sensor surface 30 of the image sensor 22. FIG. 6B illustrates a side view of the image sensor surface 30 of the image sensor 22, illustrating a state where the first cleaning unit 4 is brought close to the image sensor surface 30 and emitting a jet of air.

As illustrated in FIG. 6A, the control unit 10 controls the movable base 6 to move the first cleaning unit 4 to trace a moving track 31 over the image sensor surface 30 of the image sensor 22 while emitting a jet of air. As illustrated in FIG. 6B, the first cleaning unit 4 is controlled to emit the jet of air in a traveling direction 33 during movement. The moving track 31 is set to spread out to trace a spiral pattern from the center portion of the image sensor 22. By taking such a track, the first cleaning unit 4 can blow dust adhering to the image sensor surface 30 off the image sensor 22 and prevent the dust once blown from adhering to the image sensor surface 30 again. Tilting and moving the first cleaning unit 4 to emit the jet of air in the traveling direction 33 can also produce the effect of discharging the dust farther away from the image sensor 22. In addition, the first cleaning unit 4 can be operated to avoid the shielding member 26 located near an end of the image sensor surface 30.

In such a manner, the first cleaning unit 4 can remove dust such as relatively large pieces of solid dust and dust particles adhering to the image sensor surface 30 of the image sensor 22 from the image sensor surface 30 by the jet of air. Suppose that there are large pieces of solid dust adhering to the image sensor surface 30. If, in such a state, the image sensor surface 30 is cleaned by sweeping as with the second cleaning unit 5, the dust can be dragged to damage the surface. In contrast, the method for removing dust in a contactless manner as with the first cleaning unit 4 has the effect that the image sensor surface 30 is less likely to be damaged since dust will not be dragged over.

According to the present exemplary embodiment, the control unit 10 controls the movable base 6 so that the first cleaning unit 4 is kept out of contact with the image sensor surface 30 of the image sensor 22 through the first cleaning sequence. This can further reduce the possibility that the image sensor surface 30 of the image sensor 22 can be damaged. In step S112, after the jetting of the air, the first cleaning unit 4 is retracted from near the image sensor 22. The first cleaning sequence ends.

Figure 4C:
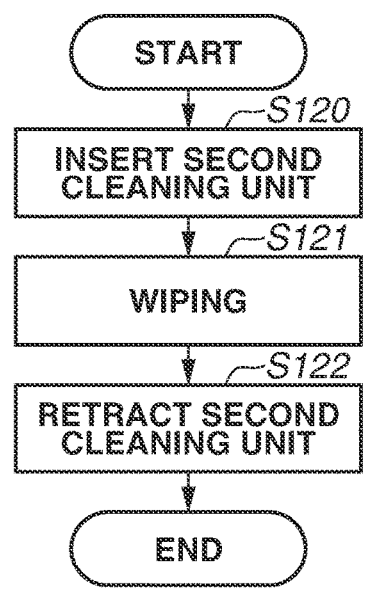

FIG. 4C is a flowchart for describing a second cleaning sequence in which the second cleaning unit 5 is used to clean the surface of the detection element in a contact manner. The control unit 10 performs the operations of the flowchart or issues operation instructions to various components as appropriate in the entire cleaning sequence performed by the cleaning apparatus 100. At the stage when this second cleaning sequence is started, the cleaning apparatus 100 is in the state where the camera 200 is already fixed by the camera fixing portion 23 and the fixing portion 2, and the communication unit 17 has established communication with the camera 200 via the camera communication unit 24 and the USB connection cable.

In step S120, the control unit 10 initially controls the movable base 6 to direct the second cleaning unit 5 toward the fixing portion 2 and move the second cleaning unit 5 to pass through the fixing portion 2 and the camera fixing portion 23 so that the portion (tip) of the second cleaning unit 5 to be used for cleaning approaches the image sensor 22. If a solvent for removing oil stains is used during wiping, the control unit 10 controls the movable base 6 to immerse the tip of the second cleaning unit 5 into a container containing the solvent, arranged at a different rotational position, before directing the second cleaning unit 5 toward the fixing portion 2. In step S121, the tip of the second cleaning unit 5 located near the image sensor 22 is brought into contact with the image sensor 22, and the surface of the image sensor 22 is wiped with the wiper (such as a piece of cloth or paper) attached to the tip.

Figure 7A:
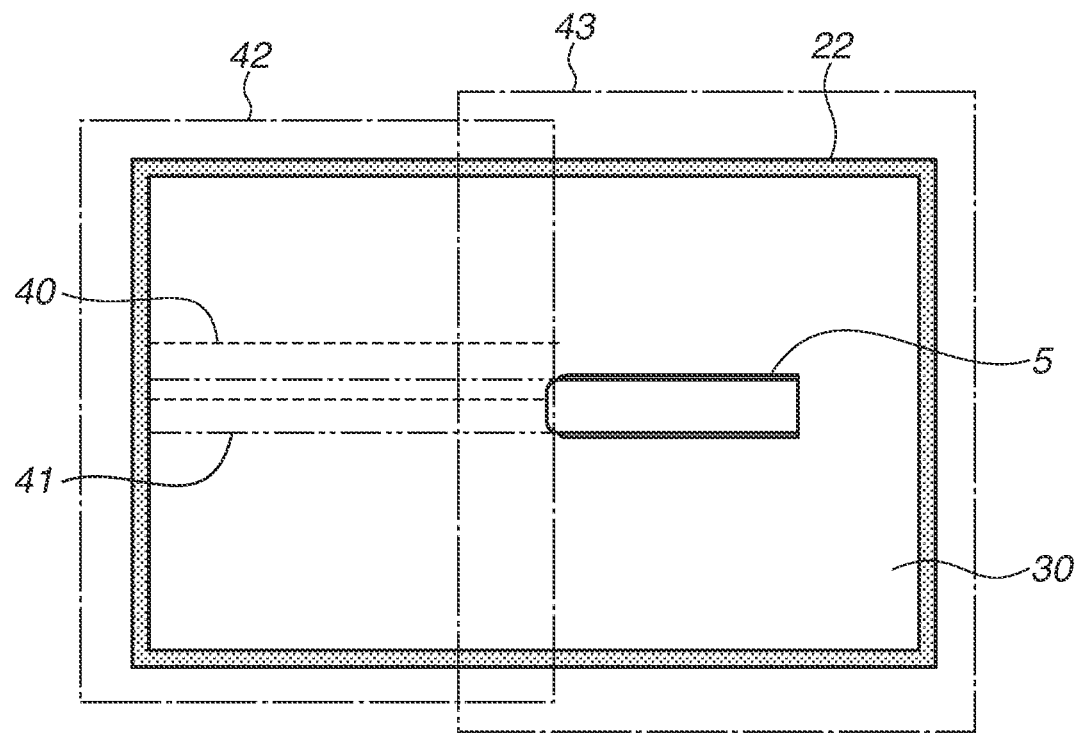
FIGS. 7A and 7B are diagrams illustrating the image sensor in a second cleaning sequence according to the present exemplary embodiment.
Figure 7B:
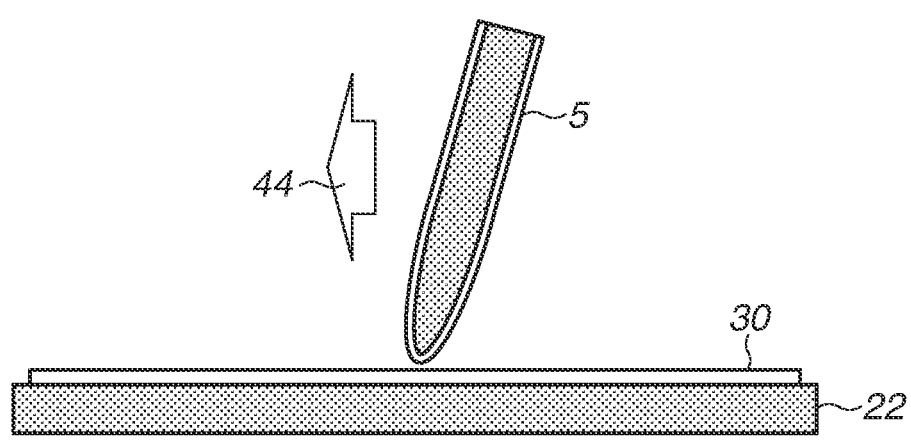

FIGS. 7A and 7B are conceptual diagrams for describing the cleaning method of the second cleaning unit 5 in step S121. FIG. 7A illustrates a front view of the image sensor surface 30 of the image sensor 22. FIG. 7B illustrates a side view of the image sensor surface 30 of the image sensor 22, illustrating a state where the second cleaning unit 5 makes contact with the image sensor surface 30 and wipes the image sensor surface 30 with the wiper at the tip.

As illustrated in FIG. 7A, the control unit 10 controls the movable base 6 to move the second cleaning unit 5 over the image sensor surface 30 of the image sensor 22 while performing wiping with the wiper at the tip. As illustrated in FIG. 7B, the second cleaning unit 5 is controlled to move in contact with the image sensor surface 30 as tilted in a cleaning direction 44 during movement.

As illustrated in FIG. 7A, the second cleaning unit 5 is caused to sequentially scan for wiping so that cleaned areas overlap as illustrated by a first moving track 40 and a second moving track 41. A first cleaning area 42 and a second cleaning area 43 are further overlapped to not leave unwiped portions. Each cleaning area is set to a wide area beyond the edges of the image sensor surface 30 so that the entire image sensor surface 30 is thoroughly wiped. To prevent unwiped portions in each cleaning area and drive dust out of the image sensor surface 30, the image sensor surface 30 basically can be wiped in one direction. FIG. 7B illustrates a state where the first cleaning area 42 is wiped in the cleaning direction 44. To facilitate sliding, the second cleaning unit 5 is brought into contact with the image sensor surface 30 as tilted from a plane perpendicular to the cleaning direction 44 in a direction opposite to the cleaning direction 44. If pixels at an end of the image sensor surface 30 are hidden under the shielding member 26, tilting and scanning the second cleaning unit 5 as illustrated in FIG. 7B enables wiping to the corners without the second cleaning unit 5 touching the shielding member 26.

By the foregoing procedure, the second cleaning unit 5 can remove dust and stains such as sticky oil adhering to the surface of the image sensor 22 off the surface. In step S122, after cleaning, the control unit 10 retracts the second cleaning unit 5 from near the image sensor 22. The second cleaning sequence ends.

Figure 5:
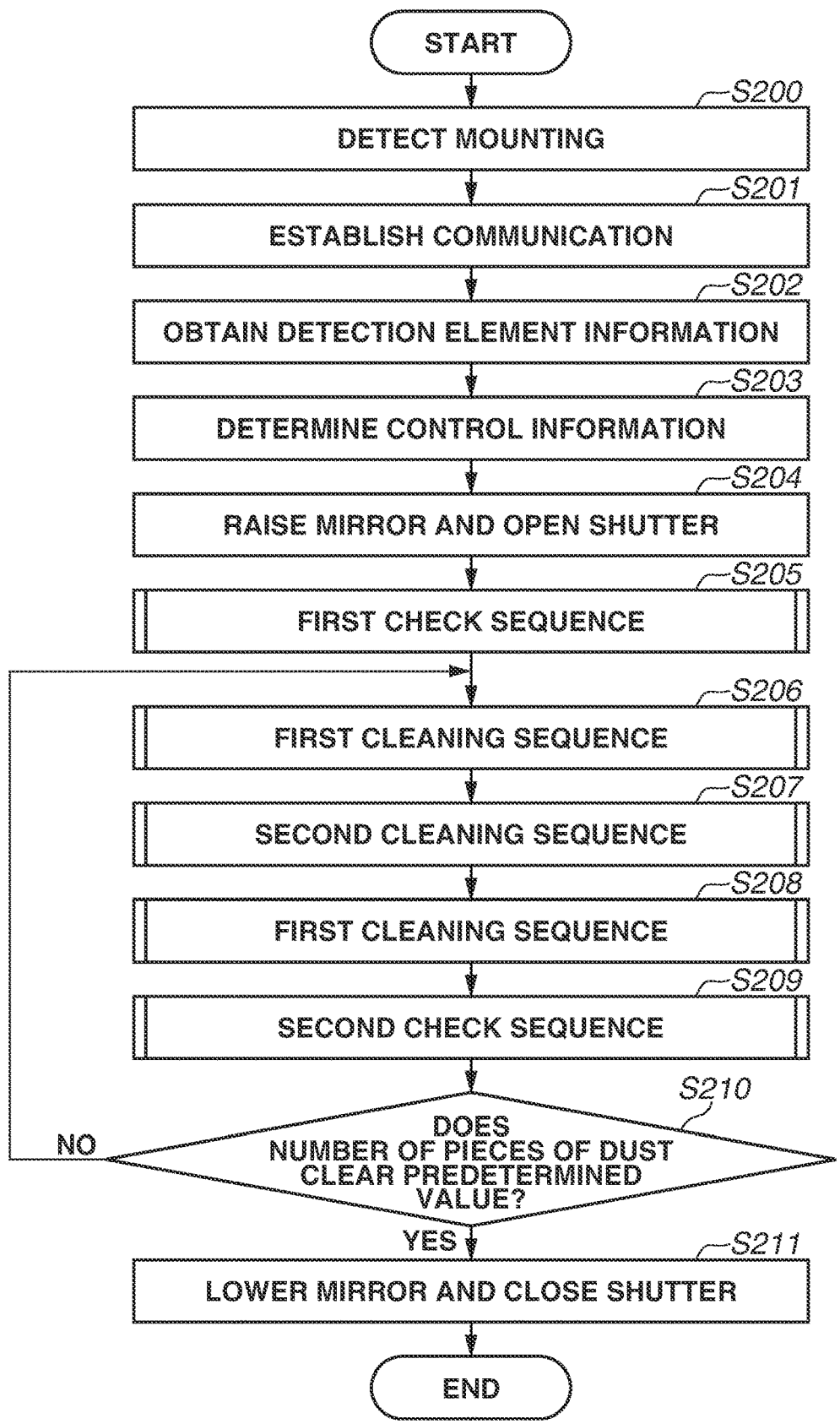
FIG. 5 is a flowchart for describing a series of cleaning sequences according to the present exemplary embodiment.

Next, a flow of the entire cleaning sequence according to the present exemplary embodiment will be described with reference to the flowchart of FIG. 5. The processing of this flowchart is started, for example, in response to power-on by the operation of the power supply SW 15 or in response to the reception of a cleaning step start instruction from the input unit 8. The control unit 10 performs the operations of the flowchart or issues operation instructions to various components.

In step S200, the control unit 10 detects that the camera fixing portion 23 of the camera 200 is mounted and fixed to the fixing portion 2, by using the connection terminals provided on the fixing portion 2. In step S201, the control unit 10 detects that the communication unit 17 and the camera communication unit 24 are electrically connected. The control unit 10 is thereby triggered to establish communication between the cleaning apparatus 100 and the camera 200.

In step S202, the control unit 10 obtains detection element information about the detection element to be cleaned. Examples of the detection element information include the position, size, and material of the image sensor 22, and the positions of members that can interfere with the cleaning of the image sensor 22. Such pieces of information may be obtained from the camera 200 by communication. The detection element information may be read from a database stored in advance in the memory 16 based on model information about the camera 200, obtained from the camera 200. The detection element information or the model information about the camera 200 may be obtained by user input via the input unit 8. In an exemplary embodiment in which the check unit 3 includes a sensor for detecting the state of the image sensor 22, the control unit 10, in this step, obtains the detection element information based on information detected by the check unit 3, such as an image.

In step S203, the control unit 10 determines control information based on the detection element information about the image sensor 22, obtained in step S202. Specifically, based on the position and size information about the image sensor 22, the control unit 10 determines respective driving widths to advance and retract the check unit 3, the first cleaning unit 4, and the second cleaning unit 5, an air jet position and jet strength of the first cleaning unit 4, a wiping range of the second cleaning unit 5, and the presence or absence of a solvent to be applied to the wiper. According to the present exemplary embodiment, there is prepared a plurality of cleaning courses each using at least either one of the first and second cleaning units 4 and 5. The user can select a cleaning course, for example, from a plurality of candidates displayed on the display unit 7 in consideration of the state of stains and work time. Examples of the cleaning courses prepared include the following:

Course 1: First check sequence→first cleaning sequence-→second cleaning sequence→first cleaning sequence→second check sequence;

Course 2: First check sequence→first cleaning sequence-→second cleaning sequence→second check sequence;

Course 3: First check sequence→second cleaning sequence-→first cleaning sequence→second check sequence;

Course 4: First check sequence→first cleaning sequence-→second check sequence;

Course 5: First check sequence→second cleaning sequence-→second check sequence; and Course 6: First check sequence.

According to the present exemplary embodiment, the rest of the flowchart will be described of the case in which course 1 is selected. If other courses are selected, steps not needed for the selected course may be omitted (skipped without performing any operation) as appropriate. It will be understood that the settable courses are not limited thereto. A course in which the user can freely set and create various sequences, including the order of cleaning and the numbers of times of cleaning, may be provided. In other words, the control unit 10 accepts the setting of a combination of cleaning operations by the first cleaning unit 4 and the second cleaning unit 5 either based on the plurality of combination patterns prepared in advance or manually. The control unit 10 then performs the cleaning of the detection surface by controlling the order and the numbers of times of cleaning by the first cleaning unit 4 and the second cleaning unit 5 based on the accepted setting.

In step S204, to perform various sequences on the image sensor 22, the control unit 10 transmits a signal for instructing the camera control unit 21 to raise the mirror 25 and open the shutter (shielding member) 26. Receiving the instruction signal for mirror-up and shutter opening, the camera control unit 21 raises the mirror 25 and opens the shutter 26. The camera control unit 21 then transmits a signal notifying of the completion of the operation to the control unit 10. Upon reception of the signal, the processing proceeds to step S205. Depending on the model of the camera, like mirrorless single lens cameras mentioned above, the image sensor 22 is not shielded and can be cleaned without this step S204. In such a case, this step S204 and step S211 to be described below are not needed.

In step S205, the control unit 10 performs the check sequence illustrated in FIG. 4A as a first check sequence before cleaning. In step S206, the control unit 10 performs the first cleaning sequence illustrated in FIG. 4B as the first cleaning of the first cleaning sequence using the first cleaning unit 4. In step S207, after the end of the first cleaning of the first cleaning sequence, the control unit 10 performs the second cleaning sequence using the second cleaning unit 5, illustrated in FIG. 4C. The reason why the first cleaning sequence is performed before the second cleaning sequence is to remove large pieces of dust adhering to the image sensor surface 30 by the first cleaning sequence in advance to prevent damage on the image sensor surface 30 by the large pieces of dust from being dragged during the wiping by the second cleaning unit 5.

In step S208, after the end of the second cleaning sequence, the control unit 10 performs a second round of first cleaning sequence by the first cleaning unit 4. The operations in the sequence may be the same as or different from in step S206. The reason why the first cleaning sequence is performed here after the second cleaning sequence is that fibers of the wiper may be left on the image sensor surface 30 after the wiping by the second cleaning unit 5 and that dust pushed off the image sensor surface 30 may remain nearby. The image sensor surface 30 can be blown clean of such dust particles by performing the first cleaning sequence after the second cleaning sequence.

After the end of the second first cleaning sequence in step S208, then in step S209, the control unit 10 performs the check sequence illustrated in FIG. 4A as a second check sequence after cleaning. A difference from the first check sequence before cleaning is that, in step S104, images and states, such as the number of pieces of dust, before and after the cleaning can be displayed on the display unit 7 for comparison. In step S210, the control unit 10 determines whether the number of pieces of dust clears a predetermined value (falls below the predetermined value) based on image information after cleaning, obtained in step S209. If the predetermined value is not cleared (NO in step S210), the processing returns to step S206. In step S206, the control unit 10 performs cleaning again. To remove dust that remains unremoved even after subjected to the cleaning sequences once, the control unit 10 can change various parameters for cleaning and perform the cleaning sequences again. For example, in the case of the first cleaning unit 4, the air strength can be made higher than before. The degree of charging by the ionizer can be made higher than before. The jetting time can be made longer than before. The moving range can be made wider than before. For the second cleaning unit 5, the wiper can be permeated with a solvent if not in the previous cleaning. The contact pressure against the image sensor surface 30 can be made higher than before.

If the predetermined value is cleared in step S210 (YES in step S210), the processing proceeds to step S211. In step S211, the control unit 10 transmits a signal for instructing the camera control unit 21 to lower the mirror 25 and close the shutter 26. In step S211, receiving the instruction signal for mirror-down and shutter closing, the camera control unit 21 lowers the mirror 25 and closes the shutter 26. The camera control unit 21 then transmits a signal for notifying of the completion of the operation to the control unit 10. Receiving the signal, the control unit 10 ends the cleaning sequence.

According to the present exemplary embodiment, the number of pieces of dust remaining on the image sensor 22 is detected to check the cleaning state in step S210. However, this is not restrictive. Other analysis results indicating a state of the image sensor 22 analyzable from an image may be used as the criteria. According to the present exemplary embodiment, the cleaning sequences are described to be repeated until the number of pieces of dust clears the predetermined value. However, a result of cleaning such as the number of pieces of dust may be simply displayed on the display unit 7 without providing repetitive processing in particular.

As described above, according to the present exemplary embodiment, the cleaning by the first cleaning unit 4 that cleans the detection surface of the detection element for detecting a physical quantity by wind pressure (jetting) is performed, and then the cleaning by the second cleaning unit 5 that makes contact with and wipes the detection surface is performed. A plurality of types of dust adhering to the detection surface can thus be appropriately removed. Fibers of the wiper left during wiping, dust failed to be cleaned, and dust around the detection surface can also be removed by performing the contactless cleaning again after the wiping. The state of the detection surface before, after, or before and after cleaning can be checked by capturing an image of the detection surface to obtain the image of the detection surface before, after, or before and after the cleaning. Since the light source for irradiating the detection surface here is a point source, an image having a greater depth of field, which facilitates recognition of dust, can be obtained. This facilitates visual observation or detection of dust remaining on the detection surface. The state of dust can be analyzed by analyzing the captured image(s) of the detection surface, and the number of pieces of dust can be presented and/or a display for enhancing the visibility of dust can be provided.

Since the cleaning apparatus 100 includes a plurality of cleaning units capable of a plurality of cleaning sequences, the cleaning apparatus 100 can deal with the removal of a plurality of types of dust adhering to the detection surface of the detection apparatus including the detection element.

(Modification)

Figure 8A:
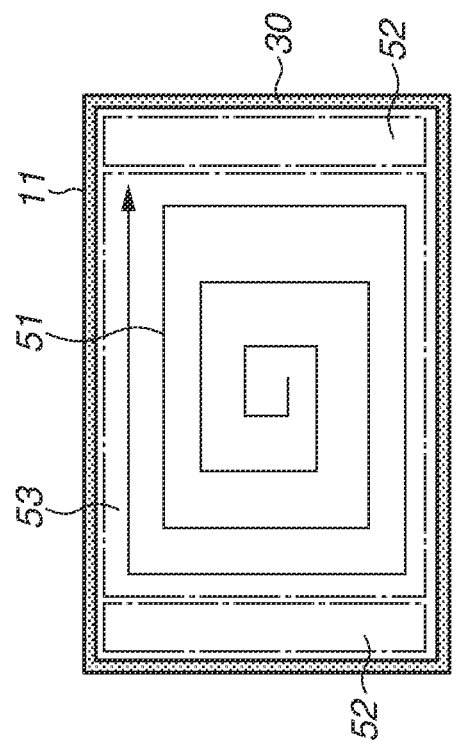
FIGS. 8A to 8D are diagrams illustrating the image sensor in a first cleaning sequence according to a modification.
Figure 8C:
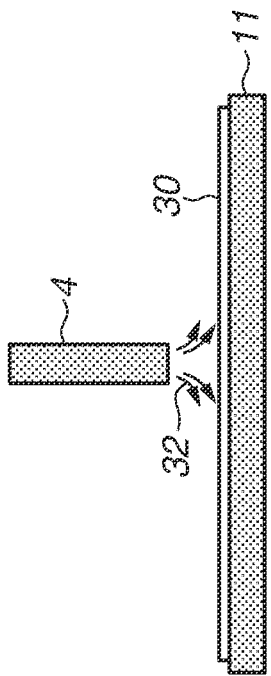
Figure 8B:
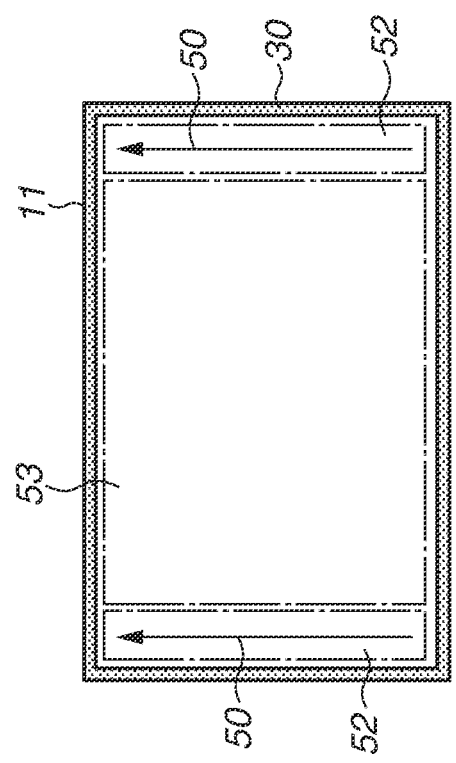
Figure 8D:
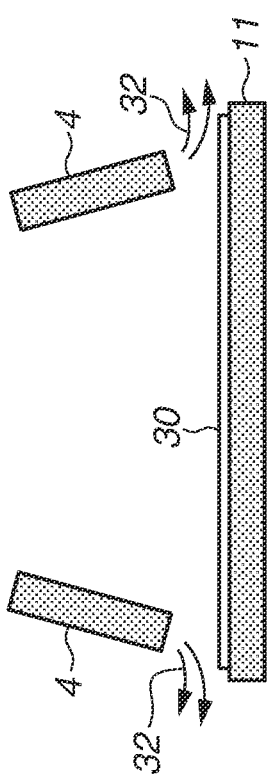

Another example of the cleaning method in step S111 of the first cleaning sequence will be described with reference to FIGS. 8A to 8D. FIG. 8A illustrates a front view of the image sensor surface 30 of the image sensor 22, illustrating moving tracks 50 that are first taken in the present modification. FIG. 8B illustrates a side view of the image sensor surface 30 of the image sensor 22, illustrating a state where the first cleaning unit 4 on a moving track 50 is brought close to the image sensor surface 30 and emitting a jet of air. FIG. 8C illustrates a front view of the image sensor surface 30 of the image sensor 22, illustrating a moving track 51 of cleaning of the first cleaning unit 4 to be taken next to the moving tracks 50 in the present modification. FIG. 8D illustrates a side view of the image sensor surface 30 of the image sensor 22, illustrating a state where the first cleaning unit 4 on the moving track 51 is brought close to the image sensor surface 30 and emitting a jet of air.

As illustrated in FIG. 8A, the control unit 10 controls the movable base 6 so that the first cleaning unit 4 moves along the moving tracks 50 in the end portions of the image sensor surface 30 of the image sensor 22 (in the directions of the arrows on the left and right in turn) while emitting a jet of air. The reason for cleaning the end portions first is to reduce intrusion of dust on the end portions, where dust from outside is likely to adhere, into the inner portion during cleaning. As illustrated in FIG. 8B, the first cleaning unit 4 is controlled to emit a jet of air outward from the end portions of the image sensor surface 30 during movement. The reason is that a mirror box and other members often occupy the space over the left and right end portions of the image sensor surface 30. The first cleaning unit 4 is tilted outward from the end portions to not interfere with such members.

Next, as illustrated in FIG. 8C, the moving track 51 is set to spread out in a spiral pattern from the center portion of the image sensor 22. By taking such a track, the first cleaning unit 4 can blow dust adhering to the image sensor surface 30 off the image sensor 22 and suppress adhesion of the once-blown dust to the image sensor surface 30 again. The nozzle of the first cleaning unit 4 on the moving track 51 may be tilted in a traveling direction as illustrated in FIG. 6B to enhance the dust removing performance. However, controlling the tilt direction upon each turn complicates control and needs more driving time. In the present modification, as illustrated in FIG. 8D, the first cleaning unit 4 therefore emits a jet almost perpendicularly to the image sensor surface 30 without changing the tilt based on the traveling direction. The moving directions on the moving tracks 50 may be vertically reversed. The moving directions on the moving track 51 may trace a reverse turning direction.

As described above, in the present modification, the first cleaning unit 4 can blow dust adhering to the image sensor surface 30 off the image sensor 22 while reducing the return of dust adhering to the end portions in particular to the center portion. Dust can thus be discharged from the image sensor surface 30 with higher reliability.

While exemplary embodiments of the present invention have been described above, the present invention is not limited to such exemplary embodiments, and various modifications and changes can be made without departing from the gist of the present invention.

An exemplary embodiment of the present invention can also be achieved in the following manner Supply a storage medium in which software program code describing a procedure for implementing the functions of the foregoing exemplary embodiments is recorded to a system or an apparatus. Read and execute the program code stored in the storage medium by a computer (or a CPU or microprocessing unit (MPU)) of the system or apparatus.

In such a case, the program code itself read from the storage medium implements the novel functions of the present exemplary embodiment. The storage medium storing the program code and the program constitute the present exemplary embodiment.

Examples of the recording medium for supplying the program code include a flexible disk, a hard disk, an optical disc, and a magneto-optical disk. A Compact Disc Read-Only Memory (CD-ROM), Compact Disc-Recordable (CD-R), Compact Disc-ReWritable (CD-RW), digital versatile disc read-only memory (DVD-ROM), digital versatile disk random access memory (DVD-RAM), digital versatile disk rewritable (DVD-RW), digital versatile disk recordable (DVD-R), magnetic tape, nonvolatile memory card, and read-only memory (ROM) can also be used.

The functions of the foregoing exemplary embodiments are implemented by making the program code read by the computer executable. This covers cases where an operating system (OS) running on the computer performs part or all of actual processing based on instructions of the program code, and the functions of the foregoing exemplary embodiments are implemented by the processing.

The following case is also included. The program code read from the storage medium is initially written to a memory included in a function enhancement board inserted into the computer or a function enhancement unit connected to the computer. A CPU included in the function enhancement board or the function enhancement unit then performs part or all of the actual processing based on instructions of the program code.

According to an exemplary embodiment of the present invention, the removal of a plurality of types of dust adhering to a detection surface of a detection element can be appropriately dealt with.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-142900, filed Jul. 30, 2018, which is hereby incorporated by reference herein in its entirety.

What is claimed is:

1. A method for controlling a cleaning apparatus for cleaning a detection surface of a detection element included in an external apparatus, wherein the cleaning apparatus includes a fixing portion with an opening, a first cleaner with a nozzle configured to discharge a jet of air, a second cleaner with a wiper configured to wipe a surface, and a driving unit configured to drive the first cleaner and the second cleaner to advance and retract through the opening of the fixing portion, the cleaning method comprising:
   detachably attaching the external apparatus to the fixing portion, wherein the fixing portion provides access to the detection surface of the detection element through the opening;
   driving, via the driving unit, the first cleaner toward the detection surface through the opening;
   cleaning the detection surface of the detection element by a jet of air emitted by the first cleaner;
   driving, via the driving unit, the first cleaner to retract through the opening, and driving, via the driving unit, the second cleaner to advance to the detection surface through the opening;
   wiping the detection surface of the detection element with the second cleaner;
   driving, via the driving unit, the second cleaner to retract through the opening, and driving, via the driving unit, the first cleaner to advance toward the detection surface through the opening; and
   cleaning the detection surface with a jet of air emitted by the first cleaner.

2. The method according to claim 1, further comprising checking, wherein the checking comprises capturing an image of the detection surface by an imaging unit and displaying the captured image on a display unit by a control unit.

3. The method according to claim 2, wherein an irradiation unit irradiates the detection surface with light when the imaging unit captures the image of the detection surface.

4. The method according to claim 2,
   wherein the checking is performed at least twice and comprises first checking and a second checking, and
   wherein the control unit makes a comparison based on an image obtained by the first checking and an image captured by the second checking.

5. The method according to claim 4, wherein the control unit displays the image obtained by the first checking and the image obtained by the second checking on the display unit.

6. The method according to claim 2, wherein the checking is performed both before cleaning performed by the first cleaner for a first time and after cleaning performed by the first cleaner for a second time.

7. The method according to claim 2, wherein the checking is performed both before cleaning by the first cleaner and after the wiping by the second cleaner.

8. The method according to claim 2, wherein the checking includes analyzing the image captured by the imaging unit and detecting an amount of dust on the detection surface.

9. The method according to claim 2, wherein the detection element also serves as the imaging unit configured to capture an image of the detection surface.

10. The method according to claim 1, further comprising obtaining detection element information about the detection element by a control unit,
    wherein the first cleaner and the second cleaner are controlled to clean the detection element based on the detection element information.

11. The method according to claim 10, wherein the detection element information includes at least one of a size and a position of the detection surface.

12. The method according to claim 10, wherein the detection element information includes model information indicating a model of a detection apparatus including the detection element.

13. The method according to claim 1, further comprising determining control information by a control unit based on detection element information read from a memory storing detection element information about different detection apparatuses.

14. A non-transitory computer-readable storage medium storing a program for use in a cleaning apparatus, wherein the program includes steps that, when executed by one or more processors, perform the cleaning method recited by claim 1.

15. A cleaning apparatus for cleaning a detection surface of a detection element included in an external apparatus, the cleaning apparatus comprising:
    a fixing portion to which the external apparatus is detachably attached, the fixing portion including an opening providing access to the detection surface of the detection element;
    a first cleaner including a nozzle configured to discharge a jet of air, the first cleaner being configured to clean the detection surface with the air;
    a second cleaner including a wiper configured to wipe dust off from the detection surface;
    a driving unit being configured to drive the first cleaning and the second cleaner to advance and retract, through the opening in the fixing portion; and a control unit configured to control the first cleaner, the second cleaner, and the driving unit, wherein the control unit comprises one or more processors;

a non-transitory computer-reading storage medium storing instructions which, when executed by the one or more processors, cause the following cleaning course to be performed:

driving the driving unit to advance the first cleaner toward the detection surface;

cleaning the detection surface by the first cleaner;

driving the driving unit to retract the first cleaner and advance the second cleaner to the detection surface;

wiping the detection surface by the second cleaner;

driving the driving unit to retract the second cleaner and advance the first cleaner toward the detection surface; and thereafter, again cleaning the detection surface by the first cleaner.

16. The cleaning apparatus according to claim 15, further comprising an irradiation unit including a light source configured to irradiate the detection surface, wherein the control unit is configured to cause an imaging unit to capture an image of the detection surface in a state where the irradiation unit irradiates the detection surface with light from the light source, and wherein the control unit is configured to obtain image data from the captured image.

17. The cleaning apparatus according to claim 16, wherein the control unit is configured to analyze the image captured by the imaging unit and detect an amount of dust on the detection surface.

18. The cleaning apparatus according to claim 16, wherein the control unit is configured to display the image data on a display unit.

19. The cleaning apparatus according to claim 16, wherein the control unit is configured to cause the imaging unit to capture images in the state where the irradiation unit irradiates the detection unit with the light from the light source before and after cleaning by the first cleaner or wiping by the second cleaner, and display the obtained images on a display unit.

20. The cleaning apparatus according to claim 16, wherein the control unit is configured to cause the imagining unit to capture images in the state where the irradiation unit irradiates the detection surface with the light from the light source before first cleaning by the first cleaner and after second cleaning by the first cleaner, and wherein the control unit is configured to obtain image data.

21. The cleaning apparatus according to claim 16, wherein the control unit is configured to cause the imaging unit to capture images in the state where the irradiation unit irradiates the detection surface with the light from the light source before cleaning by the first cleaner and after wiping by the second cleaner, and wherein the control is configured to obtain image data.

22. The cleaning apparatus according to claim 16, wherein the detection element further serves as the imaging unit configured to capture an image of the detection surface.

23. The cleaning apparatus according to claim 15, wherein the control unit is configured to clean the detection element by controlling the first cleaner and the second cleaner based on detection element information about the detection element.

24. The cleaning apparatus according to claim 23, wherein the detection element information includes at least one of a size and a position of the detection surface.

25. The cleaning apparatus according to claim 23, wherein the detection element information includes model information indicating a model of a detection apparatus including the detection element.

26. The cleaning apparatus according to claim 23, wherein the control unit is configured to determine control information based on the detection element information read from a memory storing detection element information about different detection apparatuses.

27. The cleaning apparatus according to claim 15, wherein the fixing portion includes lighting to irradiate the detection surface.

28. The cleaning apparatus according to claim 15, wherein the first cleaner includes an ionizer for electrically charging air to provide a destaticizing function so that dust adhering to the detection surface is destaticized.

29. The cleaning apparatus according to claim 15, wherein the wiper is configured so that a new portion of the wiper makes contact with the detection surface to be cleaned as the second cleaner comes into contact and moves for wiping.

30. The cleaning apparatus according to claim 15, further comprising a rotation mechanism, wherein the control unit controls the rotation mechanism to control a tilt of the nozzle when the first cleaner emits a jet of air to the detection surface and controls a tilt of the wiper when the second cleaner wipes the detection surface.

31. The cleaning apparatus according to claim 30, wherein the control unit controls the rotation mechanism to move the first cleaner to trace a spiral pattern over the detection surface while emitting the jet of air, and wherein the spiral pattern is traced from a center portion of the detection surface.

\* \* \* \* \*